United States Patent [19]
De Pauw et al.

[11] Patent Number: 5,606,699
[45] Date of Patent: Feb. 25, 1997

[54] STORING AND QUERYING EXECUTION INFORMATION FOR OBJECT-ORIENTED PROGRAMS

[75] Inventors: Wim De Pauw, Scarborough; John M. Vlissides, Mohegan Lake, both of N.Y.

[73] Assignee: International Business Machines Corporation, Armonk, N.Y.

[21] Appl. No.: 431,226

[22] Filed: Apr. 28, 1995

[51] Int. Cl.$^6$ .................................................... G06F 9/455
[52] U.S. Cl. ........................................ 395/683; 395/603
[58] Field of Search ............................... 395/600, 700, 395/183.13, 183.14, 183.15, 183.22, 650, 500

[56] References Cited

U.S. PATENT DOCUMENTS

| | | | |
|---|---|---|---|
| 5,247,651 | 9/1993 | Clarisse | 395/500 |
| 5,375,237 | 12/1994 | Tanaka et al. | 395/650 |
| 5,522,036 | 5/1996 | Shapiro | 395/183.14 |

OTHER PUBLICATIONS

Goldberg, Adele J. et al, "Smalltalk-80: The Language and its Implementation", Objects and Messages, 1983, pp. 5–9.
De Pauw, W., et al "Modeling Object–Oriented Program Execution", Object–Oriented Programming, Eighth European Conference, ECOOP Jul. 4–8, 1994, pp. 163–182.
Snodgrass, R., "A relational approach to monitoring complex systems" ACM Transactions on Computer Systems, 6(2), pp. 157–196, May 1988.
Domingue, J. "Compressing and comparing metric execution spaces", INTERACT '90, pp. 997–1002, Elsevier Science Publishers B. V. (North Holland) 1990.
Knuth, D. E., "Sorting and Searching" Addison–Wesley, Reading, Mass. 1973. pp. 389–393, 507–543.

*Primary Examiner*—Paul V. Kulik
*Attorney, Agent, or Firm*—Louis J. Percello

[57] ABSTRACT

During the execution of an object-oriented program, an execution model extracts information from events in an event stream to create a dictionary of (stored) "communication records." These communication records represent communications to or between objects. A client program permits a user to query the records of the dictionary to access information and gain a better understanding of the program's execution. Different dictionary structures for storing information can be used to represent the communication records for these communications. Moreover, in alternative preferred embodiments, the dictionary can be arranged in various hierarchical structures. By providing different dictionary structures, the invention is flexible enough to accommodate many types of user queries.

16 Claims, 9 Drawing Sheets

| CALLEE MESSAGE | CALLEE | COUNT | TIME |
|---|---|---|---|
| DRAW | CIRCLE1 | 24 | 10 |
| DRAW | RECTANGLE1 | 17 | 35 |
| ⋮ | ⋮ | ⋮ | ⋮ |

STORING AND QUERYING EXECUTION INFORMATION FOR OBJECT-ORIENTED PROGRAMS

FIELD OF THE INVENTION

This invention relates to the field of object-oriented programming. More specifically, it concerns storing and accessing information about the execution of object-oriented programs on a computer as a way of understanding the interaction of classes and objects.

BACKGROUND OF THE INVENTION

There are three important concepts in object-oriented programming: encapsulation, inheritance, and polymorphism. Encapsulation refers to how implementation details are hidden by an abstraction called an "object." An object is said to encapsulate data and operations on that data. An object-oriented software system is made up of objects interacting with one another. They interact by sending "messages" to each other. An object implements its response to a message in a "method." Objects are unaware of each other's implementations; they only know the messages other objects respond to. Encapsulation controls complexity by partitioning the software system into small, well-defined pieces, and it makes it easy to change part of the system without affecting other parts.

Objects send messages as a result of receiving them. The "call stack" for an object-oriented program records the current chain of communication from object to object. After the first object (on the top of) the call stack sends a message to the second object, the first object waits for the method on the second object (which implements the message) to finish executing. After the second object on the call stack sends a message to the third object, the second object waits for completion of the corresponding method, etc. The last object on (the bottom of) the call stack is the one for which a method is being executed currently. The first object on the call stack is the "caller" of the second object on the call stack. The second object is the first's "callee." Similarly, the second object on the call stack is the caller of the third object, and the third is the callee of the second, and so forth.

Inheritance refers to taxonomic relationships between objects. An object belongs to and is defined by a "class." A class defines the set of messages an object can respond to, and it defines the data and methods that implement those responses. An object is said to be an "instance" of a class. A class can have arbitrarily many instances. Inheritance lets classes be defined in terms of other classes. A class that inherits from another class is called a "subclass" of the other class (which is called the "parent class" or "superclass"). The subclass responds to the same messages as its parent, and it may respond to additional messages as well. The subclass "inherits" its implementation from its parent, though it may choose to reimplement some methods and/or add more data. Inheritance lets programmers define new classes easily as incremental refinements of existing ones. It also enables polymorphism.

Polymorphism refers to the substitutability of related objects. Objects are "related" if they have the same "type," and in most object-oriented languages that means they are instances of the same class, or they have a common parent class thorough inheritance. Objects that are related through inheritance may be treated uniformly, that is, without regard to their specific type. For example, a Graphic class that defines an abstraction for graphical objects may define a Draw method. The Graphic class might have subclasses Rectangle and Circle that reimplement the Draw method to draw a rectangle and circle, respectively. Polymorphism allows Rectangle and Circle instances to be treated uniformly as Graphic objects; that is, all one needs to know to tell an object to draw itself is that the object is an instance of a Graphic subclass. Whether the object is art instance of Rectangle or Circle is immaterial; one can send it the Draw message without knowing its exact type (e.g., Rectangle or Circle).

Polymorphism lets programmers write general code that can be customized later without change. Suppose we have code that draws pictures by sending Draw messages to a set of Graphic instances. We call pass it Rectangle and Circle objects, and it will tell them to draw themselves. Later we can define a new subclass of Graphic, say, Polygon, implementing its Draw method appropriately. Because Polygon is a subclass of Graphic, we can pass instances of Polygon to our picture-drawing code, and it will draw polygons in our picture—with no modification whatsoever.

STATEMENT OF PROBLEMS WITH THE PRIOR ART

Object-oriented programs often use thousands of objects, organized by tens or hundreds of classes. Often it's hard to understand how these programs work just by examining their code, since the code describes only the static aspects of the program (i.e., the classes). To understand the dynamic aspects of the program, there is a need to collect execution information and to analyze what has been collected. But collecting and analyzing such information poses several challenges.

For one, even a short object-oriented program can produce a huge amount of execution information. It can create many thousands of objects, and each one can communicate with every other, all in a fraction of a second. Thus the cost of storing information about these activities quickly becomes prohibitive.

Obviously, everything about a program's execution cannot be stored. Therefore a secondary challenge is to decide what information is essential and what can be safely thrown out. The choice is important, because it will determine the kinds of questions a user can ask about the program's execution.

Once the essential information is determined, the next challenge is to organize it so that it can be queried efficiently. Users will build their understanding through successive queries of execution information. It is critical that queries return information without delay; otherwise a user's thought processes and attention span will wane. The organization of execution information must be modeled on the kinds of queries users are likely to make. Any mismatch between a query and the model will require computation to overcome.

Meeting these challenges is an important step in giving users a better understanding of how object-oriented software works. Unfortunately, there is relatively little prior art on execution modeling, especially for object-oriented programs.

Some of the most relevant prior art is the work of Snodgrass. Snodgrass presents a method for monitoring program execution in which a user expresses all aspects of navigation—the events of interest, the modeling criteria, and presentation—with expressions in a relational algebra. The set of events is stored in a "conceptual database" that can be "queried" for execution information.

The key problem with this approach is that queries in Snodgrass' system must be specified before execution starts. Therefore only information that is known to be required before the program executes can be identified and stored; i.e., the choice of event data to collect and process is entirely query-dependent.

In so doing, Snodgrass' representation of program execution uses relatively little storage. However, the approach supports only fixed queries whose usefulness can be predicted before execution. Because of this limitation, the user cannot pose queries during or after the execution of the program. Further, the user cannot pose a series of more detailed or alternative queries that might be necessary as a result of knowledge gained during and/or after program execution, and/or as a result of knowledge gained from prior queries. Using the Snodgrass system necessitates repeated program executions until the user can converge to the relevant points in the program's execution.

OBJECT OF THE INVENTION

An object of this invention is an improved system and method for dynamically storing and accessing information about the execution of object-oriented programs in answer to one or more user queries.

Another object of this invention is an improved system and method for dynamically storing and accessing execution information about object-oriented programs by storing the information in a complete, compact, and efficient way.

SUMMARY OF THE INVENTION

The present invention is a system and method for storing and accessing information about the execution of one or more object-oriented programs. The invention runs on a general purpose computer and uses an event collector that collects one or more events to create an event stream. An event includes information about an event type ("enter" or "leave"), an object name, a method name (or message), and a class name. An event may include other information. An event stream is a series of events that occur during the execution of an object-oriented program. An execution model extracts information from events in the event stream to create a dictionary of (stored) "communication records." These communication records represent communications to or between objects. A client program permits a user to query the records of the dictionary to access information and gain a better understanding of the program's execution.

In alternative embodiments, stored communications (and the communication records) can represent (1) a "combination," which records a callee message to a single callee object; and (2) a "call frame," which records a caller message sent to a caller object followed by a callee message sent to a callee object. Other communications are possible.

Different dictionary structures for storing information can be used to represent the communication records for these communications. Also, in alternative preferred embodiments, the dictionary can be arranged in various hierarchical structures. By providing different dictionary structures, the invention is flexible enough to accommodate many types of user queries.

The user accesses information from the dictionary storage by issuing queries through a client program. The results of the queries are presented to the user.

Due to the dictionary structure, the invention provides a comparatively complete, compact, and efficient representation of the execution of the program. The invention is complete because it captures as much information as possible on significant aspects of a program's execution with insignificant information loss. The invention is compact because uses as little storage as possible to hold the captured information. And the invention is efficient because it organizes execution information for easy and quick access to support efficient query computation. Further, the invention stores information about the program execution incrementally and dynamically as the program executes to provide the user with the most current statistics about the program's execution.

DETAILED DESCRIPTION OF THE INVENTION

Figure 1:
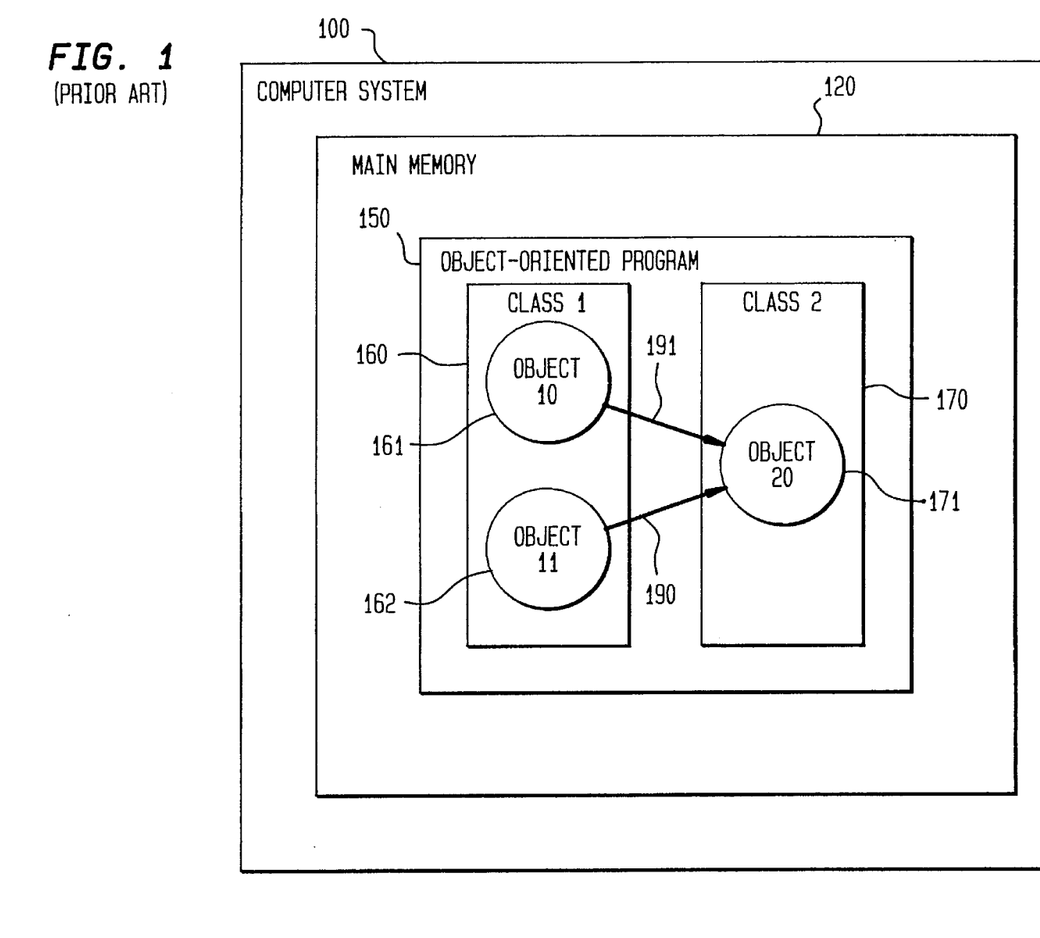
FIG. 1 is a diagram of a prior art general-purpose computer system executing an object-oriented program.

FIG. 1 is a block diagram of a general-purpose Computer System (100) with Main Memory (120). An Object-Oriented Program (150) is loaded into Main Memory (120). The Object-Oriented Program (150) is any object-oriented program known in the art. The Computer System (100) can be an IBM RS/6000 or any other general purpose computer known in the art. (RS/6000 is a trademark of the IBM corporation.)

One or more classes are defined by the Object-Oriented Program (150). Two such classes are depicted as Class1 (160) and Class2 (170).

One or more objects are created when the Object-Oriented Program (150) is executed in the Computer System (100). These objects are instances of their respective class(es). FIG. 1 shows two such objects of Class1 (160) and one object of Class2 (170). The objects of Class1 are Object10 (161) and Object11 (162). The object of Class2 (170) is Object20 (171).

Objects communicate by sending messages, as shown by the arrow Message (190). Objects also create other objects, as shown by the arrow Creation (191).

Figure 2:
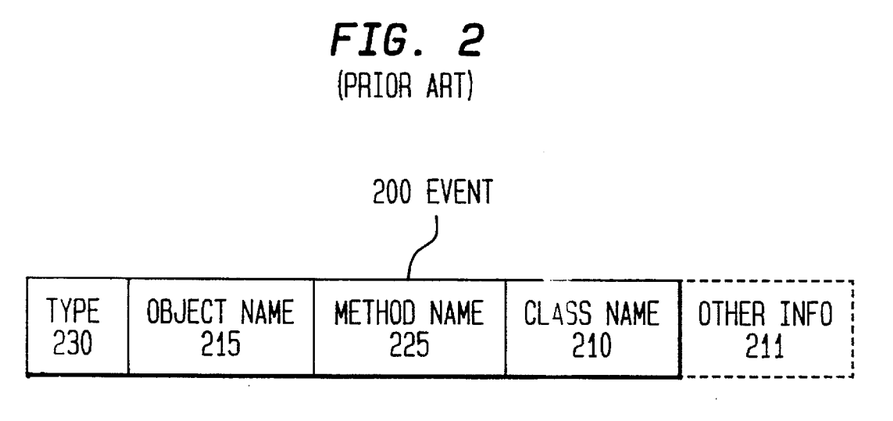
FIG. 2 is a diagram of a prior art data structure showing the content of an event.
Figure 3:
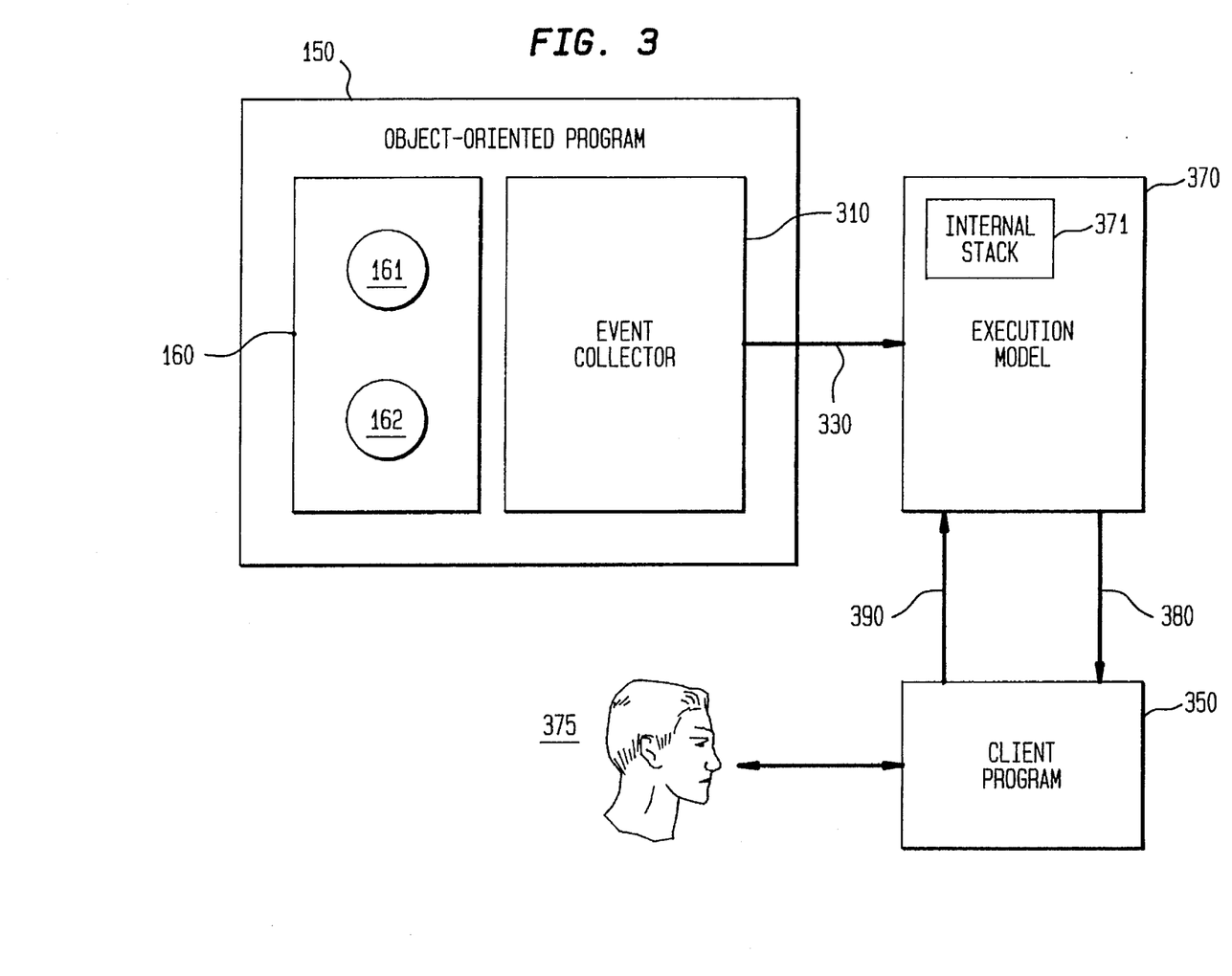
FIG. 3 is a diagram of an object-oriented program and an event collector that generates events processed by a novel execution model that stores execution information accessible by a client program.

FIG. 2 shows the structure of an Event (200) generated by an Object-Oriented Program (150) augmented with an Event Collector (310 in FIG. 3). An Event (200) is a small data structure with information about the running Object-Oriented Program (150). An Event (200) contains the following information:

Type (230), one of "Enter" or "Leave."

Method Name (225), the name of the method that is being entered or left.

Object Name (215), the name of the object that received the Message (190).

Class Name (210), the name of the class to which the object belongs.

An event may contain other information (211).

Two Events (200) are produced for every Message (190) sent in the Object-Oriented Program (150). An Event (200) of Type (230) "Enter" is produced at the start of Message (190) processing; another Event (200) of Type (230) "Leave" is produced at the end of Message (190) processing.

We are interested in understanding the run-time behavior of the Object-Oriented Program (150). FIG. 3 shows the Object-Oriented Program (150) augmented with an Event Collector (310). The Event Collector (310) generates an Event Stream (330) that is processed by a novel Execution Model (370). The Execution Model (370) stores information about the execution of the Object-Oriented Program (150); the user accesses this information through a Client Program (350) that acts as a front-end to the Execution Model (370).

The Execution Model (370) may execute concurrently with the Object-Oriented Program (150), or it may execute at a later time by processing a stored version of the event stream. In one preferred embodiment, the Execution Model (370) and/or the Client Program (350) reside in Main Memory (120) of the Computer System (100). However, the Execution Model (370) and/or the Client Program (350) need not execute on the same computer system as the Object-Oriented Program (150).

Figure 4:
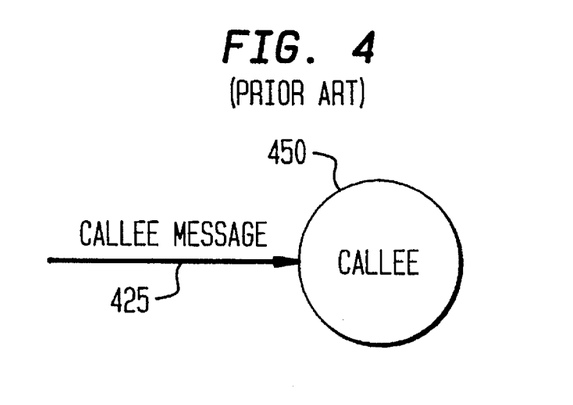
FIG. 4 is a diagram of a prior art communication called a "combination," in which a callee message is sent to an callee object.

FIG. 4 shows one fundamental unit of execution of the Object-Oriented Program (150), comprising a Callee Message (425) sent to a Callee (450) object. This information can be extracted by the Execution Model (370) from the Events (200) in the Event Stream (330). The Callee Message (425) is reflected in the Method Name (225) field of an Event (200). Likewise, the Callee (450) object is reflected in the Object Name (215) field of the Event (200).

To record such a fundamental unit of execution, it is sufficient to store information like the Callee Message (425) and the Callee (450) object as the program executes. In one preferred embodiment, every such unit is stored in a structure that can be queried to present information/statistics of interest to an object-oriented programmer. Such information/statistics may reflect which methods are called most often, how much code inheritance is exploited, and so forth. By storing additional information, more information/statistics can be presented to the user. For example, adding a timestamp to each event provides a way to ascertain how much time is spent in each method.

Figure 5:
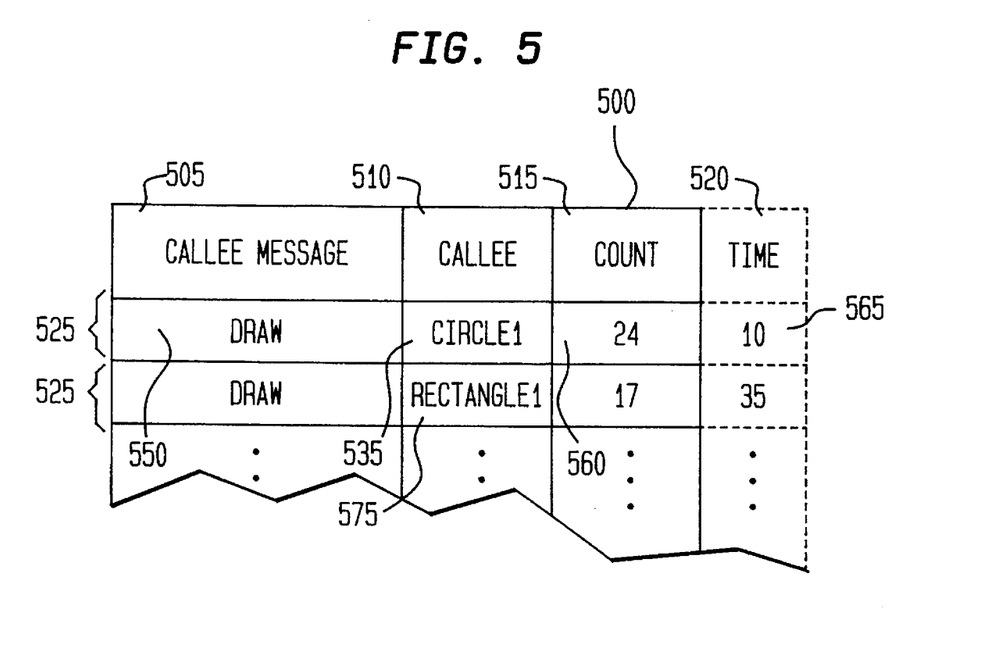
FIG. 5 is a diagram of a novel data structure used to capture a number of occurrences of combinations.

One preferred embodiment of a dictionary (500), shown as a block diagram in FIG. 5, is used to store the execution information of the Object-Oriented Program (150) in a way that uses time and space efficiently. (Storing information for every event is space-inefficient because most programs will send many thousands of messages or more. It is time-inefficient because most queries will require examining most or all of the events.) The information stored in the dictionary (500) comprises only one record (525) in the dictionary per message-object pair. The record includes a Callee Message (505) corresponding to a Callee Message (425) of FIG. 4, a Callee (510) corresponding to a Callee (450) object, and a Count (515) of the number of times the object has received the message. Optionally, other information about this pair may be included, such as CPU Time (520) spent. The information stored in such a record (525) is called a "combination record" (525).

Storing combination records (525) (and counts (515) of combination occurrences in particular) in the dictionary (500) instead of single events reduces storage costs dramatically while still supporting many useful queries.

The dictionary (500) is updated on each incoming Event (200) of type "Enter." If the message-object combination from this event is already registered as a combination record (525) in the dictionary (500), then that record's Count (515) is incremented; if the combination is not already registered, a new combination record (525) is added to the dictionary. This new record contains the Callee Message (505) and Callee (510) object (reflecting the Method Name (225) and Object Name (215) from the Event (200), respectively) along with a Count (515) initialized to one.

Figure 6:
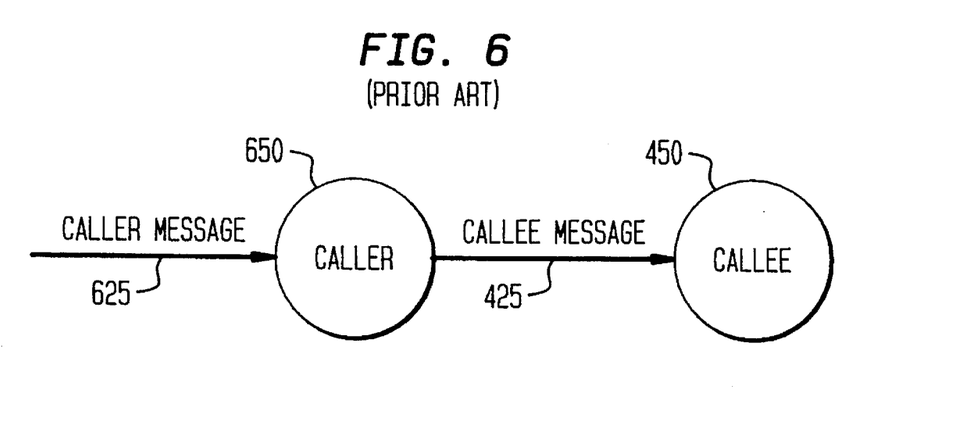
FIG. 6 is a diagram of a prior art sequence of two combinations, called a "call frame," in which a caller message is sent to a caller object that in turn sends a callee message to a callee.

FIG. 6 shows a sequence of two combinations, called a "call frame," involving two successive message sends. The first combination is a Caller Message (625) to a Caller (650) object; the second combination is a Callee Message (425) (sent by a Caller (650) object)to a Callee (450) object.

Figure 7:
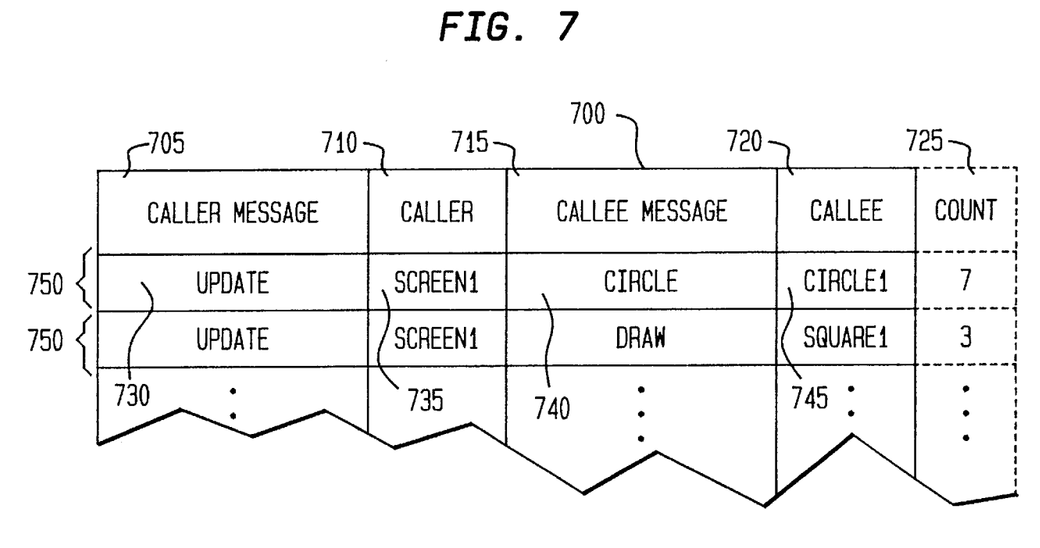
FIG. 7 is a diagram of a novel data structure used to capture the number of occurrences for a call frame.

FIG. 7 is a block diagram of one preferred novel dictionary (700) structure that allows retrieval of the sequence of messages in FIG. 6. This is significant because it's often useful to know which caller object (650) sent a callee message (425) to a given callee object (450). In a typical development process, for example, a programmer might try to understand the behavior of objects by studying their communication with other objects. This leads to queries such as, "Which object created a given object?", and, "How many messages have been sent from one object to another?".

Figure 11:
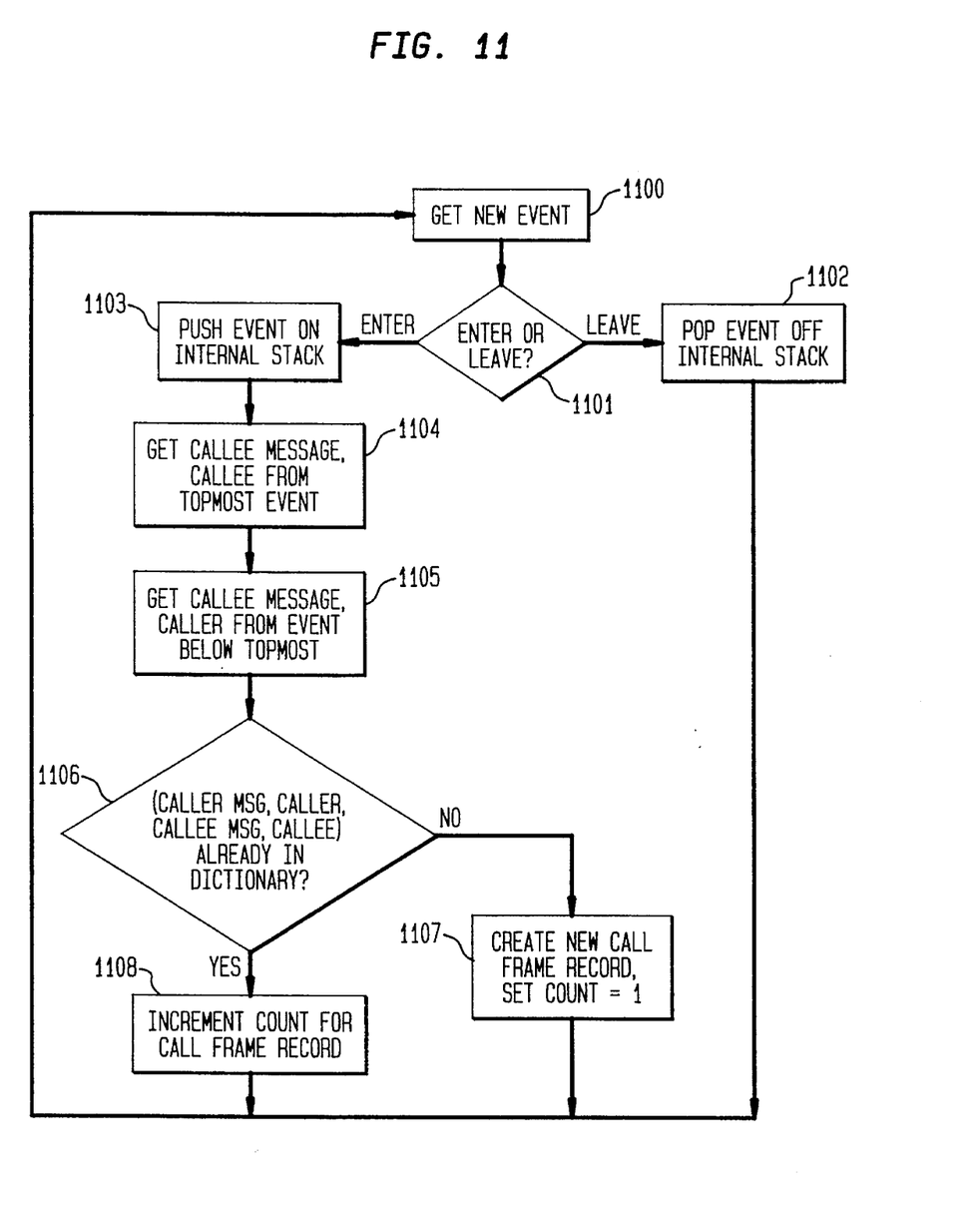
FIG. 11 is a flow chart showing the steps of populating the dictionary in FIG. 7.

The dictionary (700) stores pairs of combinations. Every record (750) in the structure contains a Caller Message (705), corresponding to a Caller Message (625) of FIG. 6; a Caller (710), corresponding to a Caller (650) object; a Callee Message (715), corresponding to a Callee Message (425); a Callee (720) object, corresponding to a Callee (450) object; and also a Count (725) of the number of times this pair of combinations occurs. This record is called a "call frame record" (750). The dictionary (700) is populated with information as depicted in FIG. 11 below.

Capturing execution information about a Object-Oriented Program (150) as a set of call frame records (750), each with a Count (725), decreases time costs for some complex queries, at the expense of a minimal increase in storage costs.

The storage structure (700) in FIG. 7 provides a compact repository from which to extract execution statistics of interest. For example, to determine which object created a given object "circle1" in response to a query, the dictionary structure (700) is searched for the call frame that has "circle1" (745) in the Callee (720) field, and "Circle" (the construction message) (740) in the Callee Message (715) field. The caller field (735) of the record (750) with matching callee field (745) and callee message field (740) fields will reveal the object (735) that created "circle1."

To determine (in response to a query) how many messages have been sent between two objects (from "screen1" to "square1," for example), the dictionary structure is searched for call frames that fulfill Caller=screen1

Callee=square1

The matching call frames indicate the methods that were involved in this communication. Moreover, the sum of the respective count fields gives the total number of messages from "screen1" to "square1."

Queries on the dictionary can be computed using commonly known dictionary search techniques. The interface for making these queries can vary across systems. In a preferred embodiment, the User (375 in FIG. 3) would specify predicates, possibly through a graphical user interface (130 in FIG. 1) to the Client Program (350). Then the Client Program (350) accesses the Execution Model (370), which in turn reports back to the Client Program (350) the call frames that satisfy the user's predicates. The Client Program (350) presents the results of the query through the user interface (130). Examples of dictionary search techniques are described in *Sorting and Searching* by D. E. Knuth, Addison-Wesley, Reading, Mass., 1973. which is herein incorporated by reference.

Other preferred embodiments are disclosed. As mentioned, most programs will have many thousands of objects or more. Objects are usually much more plentiful than the classes from which they are instantiated. Hence a user's preliminary queries will usually involve classes, not objects. Such queries will still prompt examination of many call frames.

Figure 8:
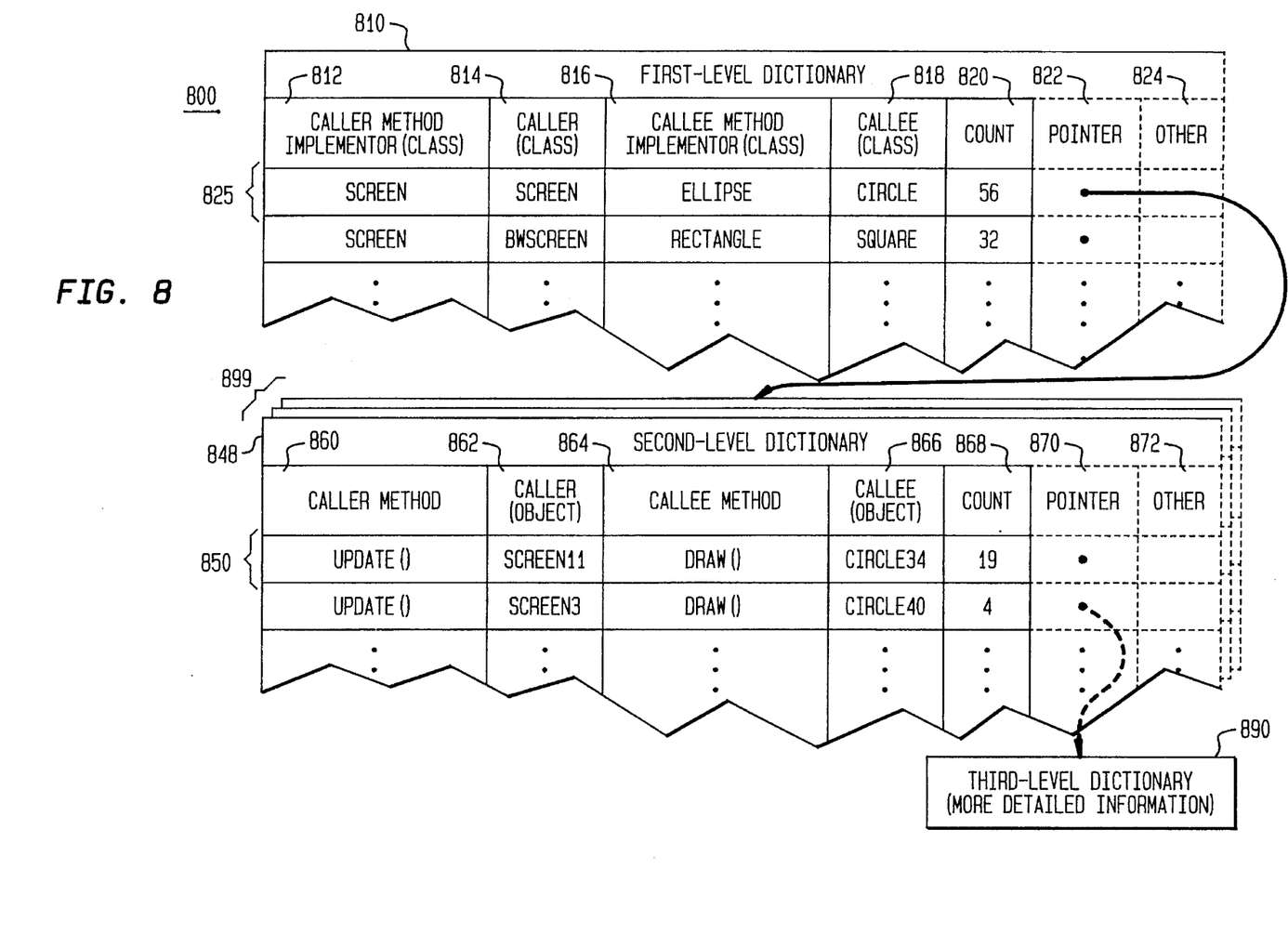
FIG. 8 is a diagram of a novel data structure that decomposes call frame information into multiple levels.

Therefore an alternative preferred embodiment of storage uses the dictionary structure (800) shown in the block diagram of FIG. 8. In this structure, the fields that refer to objects or methods of the same class are summarized in fields of a single record (825) that records a "class call frame."

Specifically, each class call frame record (825) summarizes and represents one or more call frames for which:

the Caller Message (705) is implemented by a single Caller Method Implementor Class (812), the Caller (710) belongs to a single Callee Class (814), the Callee Message (715) is implemented by a single Callee Method Implementor Class (816), and the Callee (720) belongs to a single Callee Class (818).

All such records (825) are stored in a "first-level dictionary" (810). Thus a class call frame contains at least the following:

(812) the caller method implementor class, (814) the caller class, (816) the callee method implementor class, and (818) the callee class.

Accompanying this information can be a Pointer (822) field to a "second-level dictionary" (848) along with a number of occurrences that is the sum (stored in Count (820)) of all the corresponding Count (868) fields in the second-level dictionary.

There is also a second-level dictionary (848) that contains all the call frame records (850) that a class call frame record (825) represents and summarizes. For each second-level dictionary (848), the Caller Method (860) for every call frame record (850) belongs to a single Caller Method Implementor Class (812); the Caller (862) object for every call frame record (850) belongs to a single Caller Class (814); the Callee Method (864) for every call frame record (850) belongs to a single Callee Method Implementor Class (816); the Callee (866) object for every call frame record (850) belongs to a single Caller Class (818). Therefore, for any given second-level dictionary (848), the single Caller Method Implementor Class (812), the single Caller Class (814), the single Callee Method Implementor Class (816), and the single Callee Class (818) are identical for every call frame record (850) in the given second-level dictionary (848).

Therefore, there will be a set (899) of one or more second-level dictionaries, i.e., one second level dictionary (848) for each individual class call frame record (825) of the first level dictionary (810).

This two-level dictionary structure accommodates a prevalent user tendency to issue class-level queries before object-level queries. Similarly, call frame records (850) in the second-level dictionary could include a Pointer (870) to a "third-level dictionary" (890) containing even more detailed information—organized by timestamp, for example.

Note that other information (824 and 872) can be included in any level of the dictionary (800).

Consider how a user (375) would examine communication between Screen objects and Circle objects. The relevant class call frames (825) in the first-level dictionary (810) have to satisfy the following predicates:

Caller Class=Screen

Callee Class=Circle

By specifying these predicates in a query to the Execution Model (370), it can compute and report all matching class call frame records (825). Subsequently, the user might want to know more specific information about what objects and methods were involved in the communication between Screen and Circle objects. The pointer(s) (822) from the class call frame records (825) that were found in the last query will lead to more detailed information in one or more second-level dictionaries (848).

For example, to determine which objects of the classes Screen and Circle were involved in a "Draw" message, the second-level dictionary (848) resulting from the first query would be searched for Callee Method=Draw The results of the query may be presented to the user in different ways depending on the Client Program (350).

Figure 9:
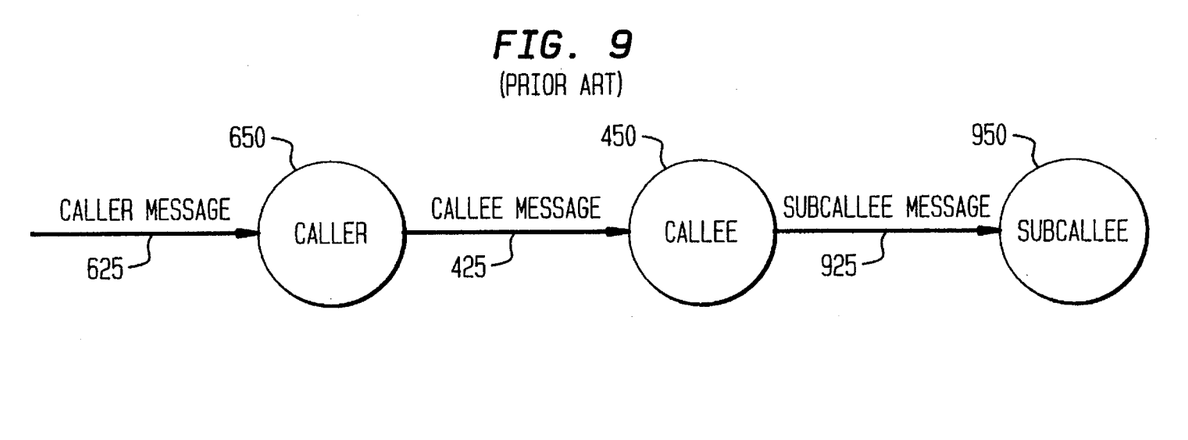
FIG. 9 is a diagram of a prior art communication, called a triple combination.

To support ever-more complex queries, the notion of a call frame can be extended to involve a sequence of three consecutive combinations instead of just two. FIG. 9 shows a sequence of three combinations, called a triple combination, involving three successive message sends. The first combination is a Caller Message (625) to a Caller (650) object; the second combination is a Callee Message (425) (sent by a Caller (650) object) to a Callee (450) object. The third combination is a Subcallee Message (925) (sent by a Callee (450) object) to a Subcallee (950) object.

Figure 10:
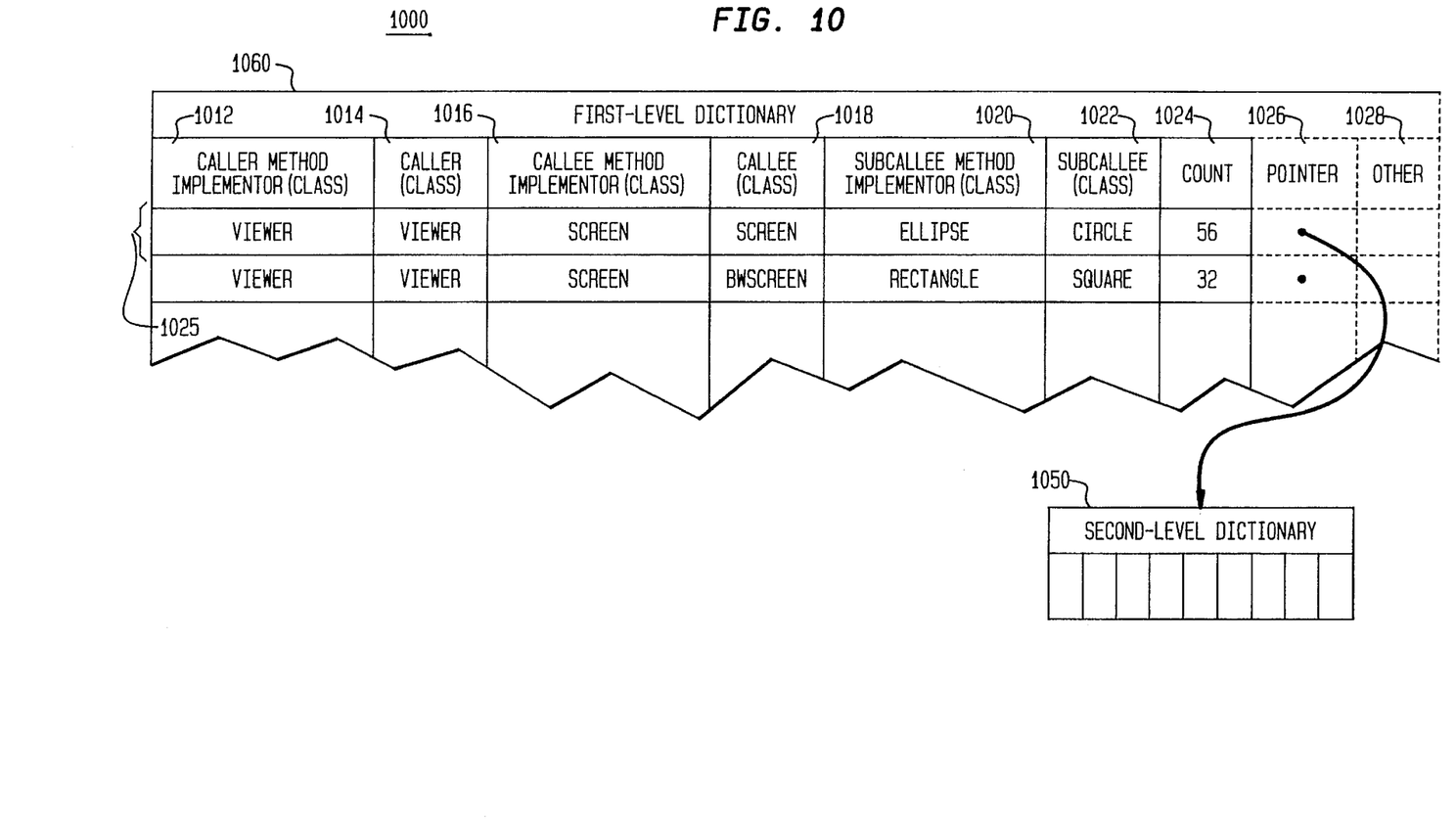
FIG. 10 is a diagram of a novel data structure showing levels of information representing triple combinations.

The same progression of storage techniques would apply, starting from a straightforward storage of all such call frames to a multi-level dictionary approach (as depicted in FIG. 10) optimized toward common querying patterns. FIG. 10 shows a two-level dictionary structure (1000) for triple combinations. The first-level dictionary (1060) has records (1025) that can contain (1012) the class that implements the caller method, (1014) the class of the caller, (1016) the class that implements the callee method, (1018) the class of the callee, (1020) the class that implements the subcallee method, (1022) the class of the subcallee A pointer (1026) to a "second-level dictionary" (1050) analogous to the one stored for call frames can be included in every record (1025), as well as the sum (stored in Count (1024)) of all the corresponding Count fields in the second-level dictionary. Other information (1028) can be stored as well.

In general, the notion of a unit of communication can be extended to a sequence of N consecutive combinations.

FIG. 11 is a flow chart showing the steps involved in populating the dictionary (700 in FIG. 7). The dictionary (700) is updated dynamically, that is, each time the Execution Model (370) receives an Event (200) from the Event Collector (310). The Execution Model (370) has an Internal Stack (371) for the incoming events. The stack makes it possible to determine the caller and callee objects and methods. For every new Event (200) received (1100 in FIG. 11) by the Execution Model (370), the event's Type (230) is ascertained (1101). If the type is "Leave," then the Internal Stack is popped (1102), and the next event is received (1100). If the event type is "Enter", then the event will be pushed (1103) onto the Internal Stack (371). The Method Name (225) and Object Name (215) from this event determine the Callee Message (715) and the Callee (720) object, respectively (1104). The Event below the topmost on the stack determines the Caller Message (705) and the Caller (710) object (1105).

If the call frame corresponding (1106) to this Caller Message (705), Caller (710), Callee Message (715), and Callee (720) is already registered in a record (750) in the structure (700) of FIG. 7, then the Count (725) of the corresponding record (750) is incremented (1108); if not already registered, then a new record (750) containing this call frame and an initial Count (725) of 1 is added (1107)to the structure (700). The next Event can now be received (1100).

Figure 12:
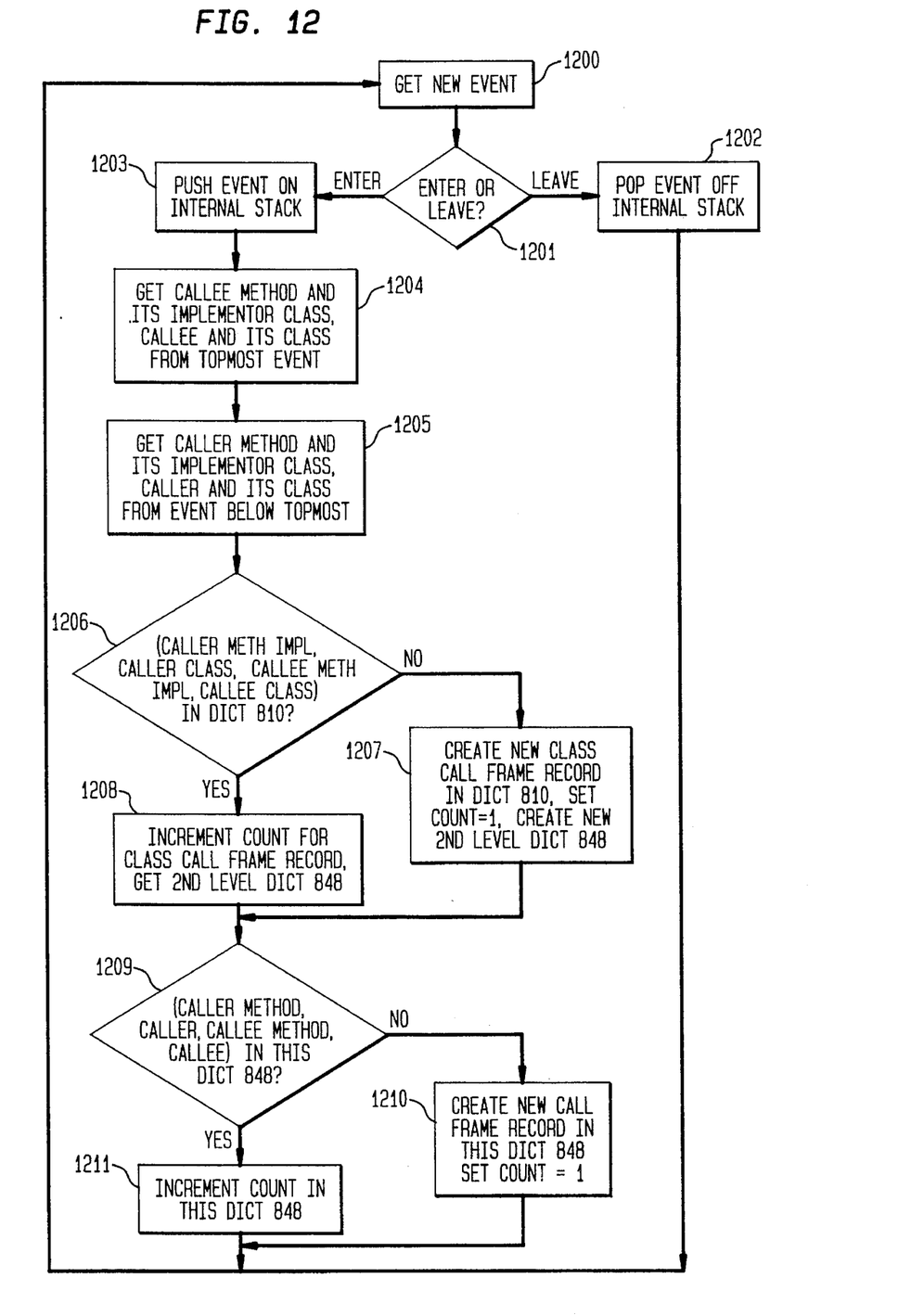
FIG. 12 is a flow chart showing the steps of populating the dictionaries in FIG. 8.

FIG. 12 is a flow chart detailing the procedure for populating the two-level dictionary structure depicted in FIG. 8. To determine the Callee/Caller and objects/methods from the incoming events, the progression of steps (1200 to 1205) is analogous to those of the flow chart in FIG. 11 (steps 1100 to 1105).

In the case of the two-level dictionary structure shown in FIG. 8, two dictionaries must be updated. The first-level dictionary (810 in FIG. 8) is searched (1206) for class call frame records containing the classes of the Caller Method, the Caller, the Callee Method, and the Callee found in (1204 and 1205).

If this class call frame exists (1208), the Count field will be incremented, and the pointer (822 in FIG. 8) to the corresponding second level dictionary (848 in FIG. 8) is retrieved. If not (1207), a new class call frame record is inserted in the first level dictionary (810), and its Count (820) is initialized to one. Then a second-level dictionary (848) is created and assigned to the pointer (822).

Next, the second-level dictionary (848) that was obtained from the preceding steps (1207 or 1208) will be updated. If this second-level dictionary (848) already contains a call frame record with the Caller Method, Caller, Callee Method, and Callee (from steps 1204 and 1205), then the corresponding Count (868 in FIG. 8) will be incremented. If not, a new call frame record with this Caller Method, Caller, Callee Method, Callee, and Count equal to one will be inserted.

The procedure for populating the two-level dictionary structure (1000) for triple combinations (shown in FIG. 10) is analogous to the procedure depicted in FIG. 12.

Given this disclosure, one skilled in the art could develop alternative equivalent embodiments that are within the contemplation of the inventors.

We claim:

1. A method for storing and accessing information about the execution of one or more object-oriented programs executing on a computer system, comprising the steps of:
   a. executing one or more object-oriented programs on a central processing unit, each program having one or more objects, each object being an instance of a class, and one or more of the objects communicating with one another during the execution;
   b. collecting one or more events to create an event stream, the event stream representing the communications between objects;
   c. extracting information from the event stream using an execution model;
   d. storing zero or more communication entries in a dictionary, each communication entry comprising a representation of a communication to one or more objects, where communications are extracted by the execution model; and
   e. accessing information about the objects during execution by one or more queries that cause a client program to perform dictionary search with parameters that satisfy the query.

2. A computer system for storing and accessing information about the execution of one or more object-oriented programs, comprising:
   a. a central processing unit executing one or more object-oriented programs, each program having one or more objects, each object being an instance of a class, and one or more of the objects communicating with one another during the execution;
   b. an event collector that collects one or more events to create an event stream, the event stream representing the communications between objects;
   c. an execution model that extracts information from the event stream;
   d. a dictionary in the execution model having zero or more communication entries, each communication entry comprising a representation of a communication to one or more objects, where communications are extracted by the execution model; and
   e. one or more queries that access the execution model to determine information about the objects during execution, the information being presented to a user.

3. A computer system, as in claim 2, where the communication entry is a combination record comprising an occurrence of communication defined as a message sent to an object.

4. A computer system, as in claim 2, the communication entry is a call frame record comprising an occurrence of communication defined as the sequence of a caller message sent to a caller object, the caller message followed by a callee message from the caller object to a callee object.

5. A computer system, as in claim 2, where the communication entry comprises an occurrence of communication defined as the sequence of a caller message sent to a caller object, the caller message followed by a callee message from the caller object to a callee object, the callee message followed by a subcallee message from the callee object to a subcallee object.

6. A computer system, as in claim 2, where the communication entry comprises an occurrence of communication defined as a particular message sequence between N objects, N being any number greater than 3.

7. A computer system, as in claim 3 where the combination record further comprises a number of occurrences of the represented communication.

8. A computer system, as in claim 4 where the call frame record further comprises a number of occurrences of the represented communication.

9. A computer system, as in claim 5 where the communication entry further comprises a number of occurrences of the represented communication.

10. A computer system, as in claim 6, where the communication entry further comprises a number of occurrences of the represented communication.

11. A computer system, as in claim 4, where the call frame record comprises a tuple having:
  a. a caller message name for the caller message;
  b. a caller object identifier for the caller object;
  c. a callee message name for the callee message;
  d. a callee object identifier for the callee object; and
  e. a number of occurrences for the communication as defined by items a through d above.

12. A computer system, as in claim 4, further comprising:
  a. a set of one or more second-level dictionaries for organizing and storing one or more call frame records, each of the second-level dictionaries in the set having one or more of the call frame records with the following fields:
    1) a caller method name for the caller method, the caller method in each call frame record of the second-level dictionary belonging to a single caller method implementor class so that all the caller methods stored in the second-level dictionary belong to the same single caller method implementor class;;
    2) a caller object identifier for the caller object, the caller object in each call frame record of the second-level dictionary belonging to a single caller class so that all the caller objects stored in the second-level dictionary belong to the same single caller class;
    3) a callee method name for the callee method, the callee method in each call frame record of the second-level dictionary belonging to a single callee method implementor class so that all the callee methods stored in the second-level dictionary belong to the same single callee method implementor class;
    4) a callee object identifier for the callee object, the callee object in each call frame record of the second-level dictionary belonging to a single callee class so that all the callee objects stored in the second-level dictionary belong to the same single callee class;
    5) a number of call frame occurrences for the communication as defined in items 1 through 4 above;
  b. a first-level dictionary for organizing and storing one or more class call frame records, each of the class call frame records having the following fields:
    1) a pointer to a selected second-level dictionary, the selected second-level dictionary being one of the set of second-level dictionaries;
    2) a caller method implementor class name for the single caller method implementor class of the selected second-level dictionary;
    3) a caller class name for the single caller class of the selected second-level dictionary;
    4) a callee method implementor class name for the single callee method implementor class of the selected second-level dictionary; and
    5) a callee class name for the single callee class of the selected second-level dictionary.

13. A computer system, as in claim 12, where each of the class call frame records in the first-level dictionary further comprises a number of class call frame occurrences for the communication as defined by item b.2) through b.5), the number of class call frame occurrences being equal to the sum of all the call frame occurrences in selected second-level dictionary.

14. A computer system, as in claim 12, where information about an object oriented program execution is accessed from the first-level and second-level dictionaries by a query to a client program that searches the dictionaries to access the information.

15. A computer system for storing and accessing information about the execution of one or more object-oriented programs, comprising
  a. a central processing unit means for executing one or more object-oriented programs, each program having one or more object means, each object means being an instance of a class, and one or more of the object means communicating with one another during the execution;
  b. an event collector means for collecting one or more events to create an event stream, the event stream representing the communications between object means;
  c. an execution model means for extracting information from the event stream;
  d. a dictionary means, in the execution model means, having zero or more communication entries, each communication entry comprising a representation of a communication to one or more object means, where communications are extracted by the execution model means; and
  c. one or more query means for accessing the execution model means to determine information about the object means during execution, the information being presented to a user.

16. A computer system for storing and accessing information about the execution of one or more object-oriented programs, comprising:
  a. a central processing unit executing one or more object-oriented programs, each program having one or more objects, each object being an instance of a class, and one or more of the objects communicating with one another during the execution;
  b. a memory; and
  c. a dictionary data structure stored on the memory, the dictionary data structure having zero or more communication entries, each communication entry representing one of the communications between objects.

* * * * *